United States Patent [19]
Eisenberger et al.

[11] Patent Number: 4,977,372
[45] Date of Patent: Dec. 11, 1990

[54] TACHOMETER DEVICE HAVING LIMITING MEANS FOR LIMITING FREQUENCY VARIATIONS

[75] Inventors: Benjamin Eisenberger, Maisons Laffitte; Pierre Roussel, Neuilly sur Seine, both of France

[73] Assignee: Jaeger, Levallois-Perret, France

[21] Appl. No.: 313,385

[22] Filed: Feb. 21, 1989

[30] Foreign Application Priority Data

Feb. 22, 1988 [FR] France ................................. 8802077

[51] Int. Cl.⁵ ............................................ G01P 3/481
[52] U.S. Cl. ..................................... 324/166; 310/155
[58] Field of Search ............... 324/160, 161, 163, 164, 324/165, 166, 167, 171, 173, 174, 175, 178, 179, 207, 208, 207.23, 207.24, 207.25, 207.26; 310/155

[56] References Cited

U.S. PATENT DOCUMENTS 4,181,432  1/1980  Flower ........................... 324/175 X
4,227,150 10/1980  Widl ............................... 324/166 X
4,417,141 11/1983  Phillips ............................ 324/163 X
4,742,297  5/1988  Heaton et al. ....................... 324/166

FOREIGN PATENT DOCUMENTS 3417279   1/1984  Fed. Rep. of Germany .
2296176   7/1976  France .
2530030   1/1984  France .
58-100752 6/1983  Japan .

Primary Examiner—Ernest F. Karlsen
Assistant Examiner—Warren S. Edmonds
Attorney, Agent, or Firm—Blakely, Sokoloff, Taylor & Zafman

[57] ABSTRACT

A tachometer device having a sensor generating an electrical signal at a frequency which is proportional to a speed to be detected, an operating drive member, and electrical link means connecting the sensor to the operating drive member. A device for limiting frequency variations in the pulses applied to the operating drive member is interposed between the sensor and said operating drive member.

14 Claims, 2 Drawing Sheets

FIG_1
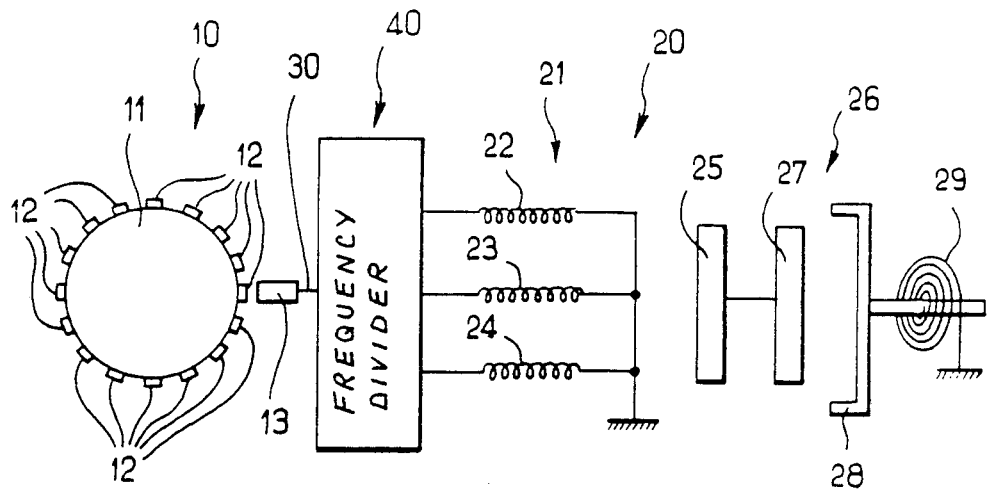
FIG_3

TACHOMETER DEVICE HAVING LIMITING MEANS FOR LIMITING FREQUENCY VARIATIONS

The present invention relates to tachometer devices.

BACKGROUND OF THE INVENTION

The present invention relates more particulary to tachometer devices of a type known per se comprising a sensor which generates an electrical signal at a frequency proportional to the speed to be detected, an operating drive member, and electrical connection means interconnecting the sensor to the operating drive member.

A conventional tachometer device of this type is shown diagrammatically in accompanying FIG. 1.

As shown in FIG. 1, the sensor 10 may comprise a phonic wheel 11 comprising uniformly spaced teeth 12 around its periphery and associated with a transducer 13 such as a Hall effect transducer, suitable for detecting the passage of the teeth 12 and for generating electrical pulses at its detection rate.

The operating drive member 20 may comprise, as shown in FIG. 1, a polyphase stepper motor element 21 and a system 26 for measuring eddy currents. The motor element 21 comprises stator windings 22, 23, and 24, and a rotor constituted by a main magnet 25. The measuring system 26 comprises an auxiliary magnet 27 coupled to the main magnet 25 in order to rotate therewith, and a bell 28.

The bell is made of an electrically conductive material. It fits over the auxiliary magnet 27 and is guided to pivot coaxially therewith. The main magnet 25 is rotated by the rotating field generated by the windings 22, 23, and 24. The auxiliary magnet 27 drives the bell by virtue of the eddy currents generated therein. A spiral spring 29 fixed to the shaft of the bell 28 limits rotation thereof.

The angle through which the bell 28 pivots relative to a neutral or rest position is directly related to the frequency of the pulses from the sensor 10. The equilibrium position of the bell 28 is determined by the driving couple applied to the bell 28 by the auxiliary magnet 27 being equal to the opposing couple applied to the bell 28 by the spring 29. The shaft of the bell 28 may be fitted with a pointer whose position is directly representative of the speed to be detected of the phonic wheel 11.

The electrical link means interconnecting the sensor 10 and the operating drive member 20 are referenced 30 in FIG. 1.

A frequency divider 40 is preferably interposed between the sensor 10 and the operating drive member 20 in order to apply the pulses generated by the sensor 10 in succession to the various windings 22, 23, and 24.

The Applicants have observed that although tachometer devices of the above type have given good service, they suffer from the following major drawback. Given the inertia of the operating drive member, it remains stationary and does not start moving when the phonic wheel 11 accelerates too violently or when the transducer 13 is suffering from intermittent faults, while the phonic wheel continues to rotate rapidly.

Further, continuing to feed power to the windings of the motor element 21 in the event of a breakdown or when the phonic wheel stops, gives rise to unacceptable heating in the device.

The present invention seeks to eliminate these drawbacks.

SUMMARY OF THE INVENTION

To this end, the invention provides a tachometer device of the type comprising a sensor generating an electrical signal at a frequency proportional to a speed to be detected, an operating drive member, and electrical link means connecting the sensor to the operating drive member, wherein a device is interposed between the operating drive member and the sensor in order to limit variations in the frequency of the pulses applied to the operating drive member.

Preferably, in the present invention, the device for limiting frequency variation comprises an integrator stage preceded by a frequency-to-voltage converter stage and followed by a voltage-to-frequency converter stage.

According to another advantageous feature of the present invention, the control pulses applied to the operating drive member are defined by a monostable. This disposition makes it possible to avoid the device overheating by limiting the duration of the control pulses applied to the drive member.

BRIEF DESCRIPTION OF THE DRAWINGS

An embodiment, of the invention is described by way of example with reference to the accompanying drawings, in which:

FIG. 1 is described above and shows the structure of a conventional tachometer device;

MORE DETAILED DESCRIPTION

Figure 3A:
FIGS. 3A–3D show four electrical waveforms for explaining the operation of the device.
Figure 3B:
Figure 3C:
Figure 3D:
Figure 2:
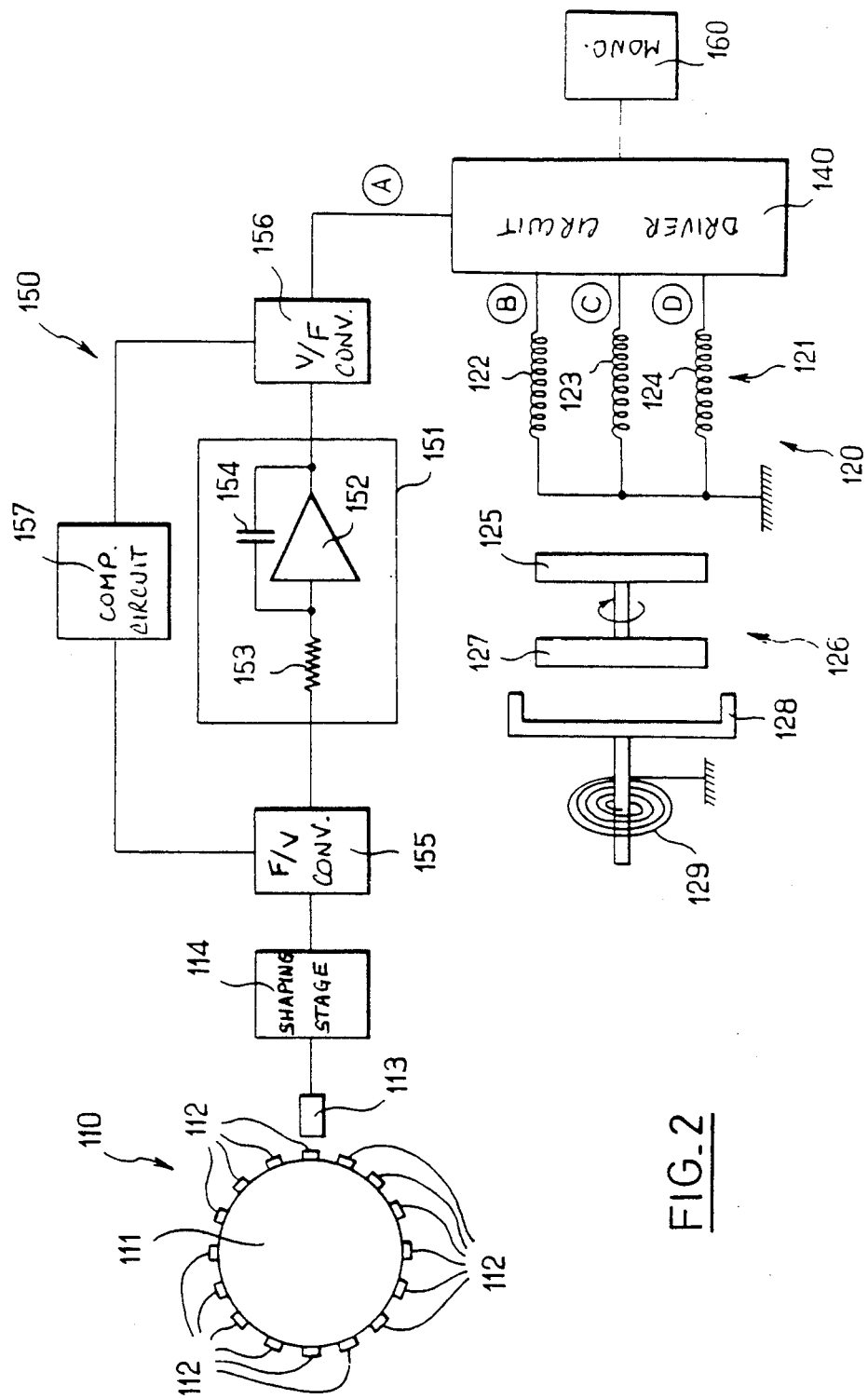
FIG. 2 is a block diagram showing the structure of a tachometer device in accordance with the present invention.

The device shown in accompanying FIG. 2 comprises a sensor 110, an operating drive member 120, electrical link means 130, and frequency variation limiting means 150.

The sensor 110 is designed to generate an electrical signal at a frequency proportional to the speed to be detected. It may be constituted by a phonic wheel 111 provided with uniformly spaced-apart teeth 112 around its periphery and associated with a transducer 113 such as a Hall effect transducer suitable for generating electrical pulses at the rate at which the teeth 112 go past it.

The pulses from the transducer 113 are applied via a shaping stage 114 and the electrical link means 130 to the means 150.

The means 150 in the embodiment shown in accompanying FIG. 2 comprise a series connection of a frequency-to-voltage converter 155, a long time constant integrator 151, and a voltage-to-frequency converter 156.

The integrator 151 is represented diagrammatically in the form of an operational amplifier 152 whose input is connected to the output of the converter 155 via a resistor 153 and whose output is connected to its input via a capacitor 154.

The converters may be interconnected by a circuit 157 for compensating drift in the two converters.

The pulses from the converter 156 are applied to a driver circuit 140 which controls the operating drive member 120.

The drive member 120 may be constituted in conventional manner as described above with reference to FIG. 1, by means of a polyphase stepper motor element 121 having a stator with windings 122, 123, and 124, and a permanent magnet rotor 125, together with an eddy current measuring system 126 including an auxiliary magnet 127 coupled to the magnet 125, and a bell 128 which is spring-biased by a return spring 129.

The driver circuit 140 includes as many output stages as there are windings 122, 123, and 124 in the stator of the motor element 121. Each of its outputs stages is connected to a respective winding 122, 123, or 124.

The driver circuit 140 is designed to apply the pulses generated by a monostable 160 to the windings 122, 123, and 124 in succession at the rate of the pulses delivered by the converter 156.

Reference A in FIG. 3 shows the waveform from the converter 156 as applied to the input of the driver circuit 140, while references B, C, and D show the pulses obtained at the output stages from the driver circuit 140 as generated by the monostable 160 and as applied in succession to the windings 122, 123, and 124 at the rate of the pulses delivered by the converter 156.

Thus, the duration of the control signals applied to the windings 122, 123, and 124 is limited and prevents the windings from heating up excessively, even when the device is stationary.

In the event of intermittent faults in the sensor 110 or in the event of high accelerations of the wheel 111, the output voltage from the integrator changes with a time constant which is compatible with the maximum catch-up rate of the motor.

Naturally, the present invention is not limited to the particular embodiment described above, and extends to any variant coming within the scope of the claims.

We claim:

1. A tachometer device comprising a sensor generating an electrical signal at a frequency proportional to a speed to be detected, an operating drive member, and electrical link means connecting the sensor to the operating drive member, wherein
    the operating drive member includes a polyphase stepper motor element including a stator having windings and a rotor having a magnet,
    and wherein the device further comprises:
    a limiting device interposed between the operating drive member and the sensor in order to limit variations in the frequency of the pulses applied to the operating drive member, said limiting device including:
    a frequency to voltage converter stage having its input connected to the output of the sensor,
    an integrator stage having its input connected to the output of the frequency to voltage converter stage, and
    a voltage to frequency converter stage having its input connected to the output of the integrator stage,
    a monostable, and
    a driver circuit applying pulses generated by said monostable to said windings of the operating drive member in succession and at the rate of the pulses delivered by said voltage-to-frequency converter.

2. A tachometer device according to claim 1, wherein the two converters are coupled together by a circuit for compensating drift therein.

3. A tachometer device according to claim 1, wherein the operating drive member comprises firstly a polyphase stepper motor element including a stator having windings and a rotor having a magnet, and secondly a measuring circuit comprising an auxiliary magnet coupled to the magnet of the motor element and a bell which is biased by a return spring.

4. A tachometer device comprising a sensor generating an electrical signal at a frequency proportional to a speed to be detected, an operating drive member, and electrical link means connecting the sensor to the operating drive member, wherein the device further comprises a limiting device interposed between the operating drive member and the sensor in order to limit variations in the frequency of the pulses applied to the operating drive member, said limiting device including:
    a frequency to voltage converter having its input connected to the output of the sensor,
    an integrator stage having its input connected to the output of the frequency to voltage converter, and
    a voltage to frequency converter having its input connected to the output of the integrator stage.

5. A tachometer device according to claim 4, wherein the two converters are coupled together by a circuit for compensating drift therein.

6. A device according to claim 4, wherein the control pulses applied to the operating drive member are defined by a monostable.

7. A tachometer device according to claim 4, wherein the operating drive member includes a polyphase stepper motor element including a stator having windings and a rotor having a magnet.

8. A tachometer device according to claim 7, wherein a driver circuit applies pulses generated by a monostable to the windings in succession and at the rate of the pulses delivered by the voltage-to-frequency converter.

9. A tachometer device according to claim 4, wherein the operating drive member comprises firstly a polyphase stepper motor element including a stator having windings and a rotor having a magnet, and secondly a measuring circuit comprising an auxiliary magnet coupled to the magnet of the motor element and a bell which is biased by a return spring.

10. A tachometer device of the type comprising a sensor generating an electrical signal at a frequency proportional to a speed to be detected, an operating drive member, and electrical link means connecting the sensor to the operating drive member;
    wherein the operating drive member includes a polyphase stepper motor element including a stator having windings and a rotor having a magnet;
    and wherein the device further comprises:
    a limiting device interposed between the operating drive member and the sensor in order to limit variations in the frequency of the pulses applied to the operating drive member;
    a monostable for generating pulses; and
    a driver circuit applying pulses generated by said monostable to the windings of the operating drive member in succession at the rate of the pulses deli.

11. A tachometer device according to claim 10 wherein the limiting device includes:
    a frequency to voltage converter having its input connected to the output of the sensor;
    an integrator stage having its input connected to the output of said frequency to voltage converter; and
    a voltage to frequency converter having its input connected to the output of said integrator stage.

12. A tachometer device according to claim 11, wherein the two converters are coupled together by a circuit for compensating drift therein.

13. A tachometer device according to claim 12, wherein the operating drive member comprises firstly a polyphase stepper motor element including a stator having windings and a rotor having a magnet, and secondly a measuring circuit comprising an auxiliary magnet coupled to the magnet of the motor element and a bell which is biased by a return spring.

14. A tachometer device comprising a sensor generating an electrical signal at a frequency proportional to a speed to be detected, an operating drive member, and electrical link means connecting the sensor to the operating drive member, wherein:

the operating drive member comprises firstly a polyphase stepper motor element including a stator having windings and a rotor having a magnet, and secondly a measuring circuit comprising an auxiliary magnet coupled to the magnet of the motor element and a bell which is biased by a return spring, and wherein the device further comprises, a limiting device interposed between the operating drive member and the sensor in order to limit variations in the frequency of the pulses applied to the operating drive member, said limiting device including:
- a frequency to voltage converter stage having its input connected to the output of the sensor,
- an integrator stage having its input connected to the output of the frequency to voltage converter stage and
- a voltage to frequency converter stage having its input connected to the output of the integrator stage, a monostable, and a driver circuit applying pulses generated by said monostable to said windings of the operating drive member in succession and at the rate of the pulses delivered by said voltage-to-frequency converter.

* * * * *

UNITED STATES PATENT AND TRADEMARK OFFICE
CERTIFICATE OF CORRECTION

PATENT NO. : 4,977,372
DATED : 12/11/90
INVENTOR(S) : Eisenberger et al.

It is certified that error appears in the above-identified patent and that said Letters Patent is hereby corrected as shown below:

col. 04, line 60    delete "deli."   insert --delivered at the output of said limited device.--

Signed and Sealed this

Twentieth Day of April, 1993

Attest:

MICHAEL K. KIRK

Attesting Officer

Acting Commissioner of Patents and Trademarks